United States Patent Office 2,992,283
Patented July 11, 1961

2,992,283
PREPARATION OF AROMATIC AND SATURATED
HYDROCARBONS
Jackson Eng, Sarnia, Ontario, Canada, assignor to Esso
Research and Engineering Company, a corporation of
Delaware
No Drawing. Filed July 30, 1959, Ser. No. 830,459
13 Claims. (Cl. 260—673)

The present invention is concerned with a process for the preparation and use of improved polymerization catalysts. It more specifically relates to the preparation of improved catalysts for converting low molecular weight hydrocarbons into aromatics and saturated hydrocarbons. In accordance with the present invention, an improved silica and alumina-comprising catalyst which has been treated with anhydrous hydrogen chloride is employed to convert low molecular weight olefins into aromatics and saturated hydrocarbons which boil in the motor fuel range.

In the past, olefinic materials have been treated with silica-alumina gel or zeolites both of which have been amorphous and as such have pore openings covering a wide range of diameters, from less than 5 Angstroms to 200 Angstroms and higher. Such materials, though active as cracking catalysts, have decided drawbacks when used as polymerization catalysts. The non-uniformity of the pore openings of such material has hindered their ability to selectively polymerize to low molecular weight hydrocarbons. More recently it has been suggested that highly ordered crystalline structures characterized by having pore sizes of nearly uniform dimensions, such as crystalline metallic alumino-silicates having uniform pore openings of about 4 to 15 Angstrom units, be employed as the catalyst. Although these catalysts have gone far to improve polymerization of the olefinic hydrocarbons into low molecular weight hydrocarbons, their conversion ability is not extremely high and they do not exhibit any tendency to also produce aromatics, the demand for which has increased in recent years faster than new sources have been developed.

A catalyst has now been discovered which demonstrates increased activity and selectivity for the polymerization of gaseous and low boiling liquid olefins, such as $C_2$ to $C_7$ olefins, to comparatively low molecular weight hydrocarbons boiling in the naphtha and motor fuel boiling range, i.e., from $C_5$—400° F., and, in addition, simultaneously converts olefins to aromatics. The catalyst is characterized by a highly ordered crystalline structure having pores of nearly uniform dimensions, in the range of 6 to 15 Angstroms, and has been treated with anhydrous hydrogen chloride. The catalyst structure comprises an alumino-silicate anionic cage in which the alumino and silica tetrahedra are intimately connected to each other. The dispersion of the silica and alumino tetrahedra is highly ordered, thereby making for a maximum number of active sites caused by the condensation of SiOH and AlOH groups. The uniform pore openings in the range of about 6 to 15 Angstroms allow for easy ingress of all hydrocarbon feed types and egress of the reaction products. This serves to reduce catalytic coke buildup within the structure and to improve regeneration characteristics of the catalyst.

The catalyst of the invention, as mentioned above, is a crystalline alumino-silicate which has been modified by treatment with anhydrous hydrogen chloride. It may be distinguished over known crystalline alumino-silicates by the new and unexpected results, which will be demonstrated hereinafter, the hydrogen chloride treatment permits it to achieve. Additionally it is distinguishable over the zeolite art by its nearly uniform pore openings.

Therefore, in accordance with the present invention, there is employed as a catalyst for $C_2$ to $C_7$ olefinic hydrocarbons a crystalline metallic alumino-silicate which has been treated with anhydrous hydrogen chloride and having pore openings adequate to admit freely the individual molecules to be converted. The pore openings will therefore be about 6 to 15 Angstroms in diameter. A wide range of size openings are not satisfactory for the reasons mentioned above.

The crystalline alumino-silicates may be prepared by mixing and heating sodium aluminate and sodium silicate, preferably sodium metasilicate, under carefully controlled conditions of temperatures, concentrations, and alkalinity, to produce a product which is subsequently dehydrated under conditions to preserve the crystalline structure. If desired, the sodium content of the alumino-silicate may thereafter be replaced, at least in part, by effecting ion exchange with an appropriate metal salt, such as magnesium. The base exchange, however, is not necessary.

The preparation of the alumino-silicate involves the maintenance of several critical steps. These are (1) the ratio of soda to silica, (2) the reaction temperature, (3) the pH of the solution from which the sodium alumino-silicate is crystallized, and (4) the ratio of silica to alumina. Unless these critical conditions are observed, the resulting composition will either lack crystallinity, adsorptive properties, uniform pores or the pores, if uniform, will be too small to admit any but small diameter molecules. If the proper conditions are observed, the pores will be large enough to admit most organic molecules and will be between 6 to 15 Angstroms.

The ratio of $Na_2O/SiO_2$ in the silicate employed must be at least 0.5/1, but may be as high as 2/1. Preferably the ratio is 0.7/1 to 1/1 and the reagent is sodium metasilicate. If water glass is employed, additional caustic must be present.

The composition of the sodium aluminate is less critical. Sodium aluminates having any ratio of soda to alumina in the range of 1/1 to 3/1 may be employed; however, a sodium aluminate having a high ratio of soda to alumina is preferred, and a sodium aluminate having a $Na_2O/Al_2O_3$ ratio of about 1.5/1 is particularly desirable. The amounts of sodium silicate solution and sodium aluminate solutions are such that the mol ratio of silica to alumina in the final mixture is at least 2.2/1, and preferably 2.5–4/1. However, silica to alumina ratios as high as 10/1 may be employed.

The sodium metasilicate and sodium aluminate solutions must be mixed in a manner which allows the formation of a precipitate having a uniform composition. A convenient method is to add the aluminate to the silicate at ambient temperatures using rapid and efficient agitation to make a homogeneous paste. Thereafter, the mixture is heated to about 180° to 215° F. for a period up to 200 hrs. or more to ensure crystallization to a form having interstices large enough to adsorb isoparaffinic and aromatic molecules. The heat-soaking step is essential; however, heating at temperature of about 350° F. and higher does not produce a crystalline composition having the desired uniform size pore openings.

A general scheme for preparing the crystalline alumino-silicates is as follows: A solution of sodium metasilicate is prepared, having a concentration of 30 to 300 grams, preferably 100 to 200 grams/liter. Similarly, a solution of sodium aluminate having an $Al_2O_3$ concentration of 40 to 400 grams, preferably 200 to 300 grams, is prepared. The amounts of metasilicate and aluminate solutions employed are such that the ratio of $SiO_2/Al_2O_3$ in the final mixture is 2.2/1 to 10/1, preferably 2.5/1 to 4/1. The solutions are mixed, preferably at ambient temperatures. The slurry is of such concentration that the pH is above 12. Considering the amount of sodium atoms present in the total composite, the total volume of slurry should be adjusted so that each liter of composite slurry contains about 2 to 6 equivalents of sodium, preferably about 3 to 5 equivalents of sodium. The resulting slurry is heated from 180° to 250° F., but below 300° F., for a period of time depending on the temperature. At 210° F., this is about 3 to 24 hours, and shorter at higher temperatures, although long heating times may be employed without producing any deleterious effects.

If desired, the crystalline product resulting from the heat-treating step may be reacted with the salt of a metal of the type previously enumerated, though the sodium form itself may be employed. In the latter case, the crystalline material is water-washed, filtered, and heat activated by calcination at 400° to 1000° F., preferably about 700 to 900° F. The crystalline sodium alumino-silicate formed during the heat-soaking period has the stoichiometric composition of $Na_2O.Al_2O_3.2.7SiO_2$. The sodium crystals may be exchanged with hydrogen or reacted with metal salt solutions that enhance the catalytic behavior under certain circumstances. These metals are of the type already enumerated, and may further include cobalt, nickel, copper, calcium, magnesium, chromium, iron, silver, gold, platinum, zinc, cadmium, rare earths, mercury, lead and the like. The general formula for the crystalline metallic alumino-silicate is

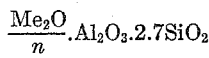

$$\frac{Me_2O}{n}.Al_2O_3.2.7SiO_2$$

where Me is a metal and $n$ is its valence.

Although it is possible by modifying the conditions of synthesis, to obtain crystals having pore diameters between about 3 and 5 Angstroms, such crystals will only allow straight chain paraffins and olefins to enter or leave the interior of the pores wherein catalyst activity occurs. Thus, conversion reactions induced within these crystals form products, such as isoparaffins and aromatics, which are too large to leave the pores. This leads to rapid deactivation of the catalyst and eventual coking.

The catalyst of the present invention is produced by treating the crystalline alumino-silicate described above with anhydrous hydrogen chloride. The temperature at which said silicate is contacted with hydrogen chloride may vary from 50° F. to 1000° F., but is preferably within the range of 800° F. to 1000° F. Pressures likewise may vary, for example from 0.2 to 1000 p.s.i.a., however it is preferable that such treatment be preformed within the range of 14 to 500 p.s.i.a. The catalyst so produced is capable of converting the olefins in an olefin-containing vapor stream into saturated hydrocarbons and aromatics both of which may be used as blends in high octane number motor fuels.

The process of the present invention comprises contacting the catalyst of the present invention with a gaseous stream containing olefinic hydrocarbons having from two to seven carbon atoms in a conversion zone. The catalyst within the conversion zone may be in the form of a fixed or fluidized bed as desired. The latter may be effected by the flow of the gaseous stream as it passes through the catalyst. Within the conversion zone the contacting temperature may range from 300° F. to 1200° F. depending on the olefinic materials present in the feed, however it is preferable that the temperature be between 400° F. and 800° F. Pressure may range from 0.2 p.s.i.a. to 5000 p.s.i.a., however the preferred range is 14 p.s.i.a. to 2500 p.s.i.a. The converted product in the gaseous state is withdrawn from the conversion zone and treated to separate the resultant saturates and aromatics or as desired.

It is thought that in the described process the catalyst causes the olefins to polymerize and converts the polymerized hydrocarbon into naphthenes and subsequently into aromatics, the latter step resulting in the liberation of hydrogen which saturates other olefins. However, irrespective of the theoretical cycle resulting from this novel process, experimentation has definitely established that aromatics and saturated hydrocarbons are the resultant conversion products.

The process of the present invention will be more readily understood by reference to the following examples illustrating the same:

EXAMPLE I

A catalyst of the present invention was prepared by contacting a 8.5 A. crystalline metallic alumino-silicate (one having pore openings of 8.5 Angstrom units) with anhydrous hydrogen chloride in a closed vessel at a temperature of 800° F. and at atmospheric pressure. Under these conditions approximately 10 grams of anhydrous hydrogen chloride was required to saturate 100 grams of the alumino-silicate.

EXAMPLE II

U.O.P. $C_7$ olefin streams were treated with two 8.5 A. alumino-silicate catalysts, one of said catalysts having been modified with hydrogen chloride as in Example I and the other catalyst not having been so treated. The trials were conducted in autoclaves under temperatures and pressures indicated in Table A. The resultant products were distilled under conditions representing 15 theoretical plates and a reflux ratio of 5 into various fractions, which were analyzed to determine their aromatic, saturate and olefin content. The fractions and their composition are shown in Table A below:

Table A

HEPTENE CONVERSION

| Catalyst | 8.5 A. Alumino-Silicate | |
|---|---|---|
| | Unmodified | Modified with HCl |
| Temp., ° F | 450 | 445 |
| Pressure, p.s.i.g. | 210 | 190 |
| Feed, ml./120 g. of catalyst | 800 | 800 |
| Feed Composition: | | |
| Boiling Range, ° F | 150–200 | 150–220 |
| Percent Aromatics | Nil | Nil |
| Percent Saturates | 6 | 6 |
| Percent Olefins | 94 | 94 |
| Bromine No | 138 | 138 |
| Product Composition: | | |
| 100–220° F. Cut— | | |
| Vol. percent | 60 | 33 |
| Percent Aromatics | Nil | Nil |
| Percent Saturates | 5 | 96 |
| Percent Olefins | 95 | 4 |
| Bromine No | 115 | Nil |
| 220–400° F. Cut— | | |
| Vol. percent | 15 | 22 |
| Percent Aromatics | Nil | 6 |
| Percent Saturates | Nil | 89 |
| Percent Olefins | 100 | 5 |
| Bromine No | 100 | 3 |
| 400–450° F. Cut— | | |
| Vol. percent | 21 | 10 |
| Percent Aromatics | Nil | 23 |
| Percent Saturates | Nil | 69 |
| Percent Olefins | 100 | 8 |
| Bromine No | 81 | 7 |
| 450+° F. Cut— | | |
| Vol. percent | 4 | 35 |
| Percent Aromatics | Nil | 56 |
| Percent Saturates | Nil | 44 |
| Percent Olefins | 100 | Nil |
| Bromine No | 55 | 8 |

Feed conversion for the unmodified 8.5 A. alumino-silicate catalyst was only about 45 percent and the converted product contained few saturated hydrocarbons and no aromatics, as may be seen from Table A above. On the other hand, the conversion product from contacting the heptenes with the hydrogen chloride modified 8.5 A. alumino-silicate catalyst evidenced that essentially all the olefins were converted into other hydrocarbon types. As may be seen from Table A, large amounts of aromatics and saturates were formed. The composite analysis of the individual fractions indicated that the lower boiling materials were essentially saturates while the higher boiling materials contained an appreciable quantity of aromatics as well as saturates. Partition chromatography indicated that the $C_5$ and $C_6$ components were entirely isoparaffins. The $C_7$ components were branched paraffins. No $C_5$, $C_6$ or $C_7$ naphthenes were found. Thus the lower boiling fractions appeared to be high octane blending stocks.

EXAMPLE III

Technical propylene was treated with two 8.5 A. crystalline metallic alumino-silicate catalysts, one of the catalysts having been modified with hydrogen chloride as in Example I and the other catalyst not having been so treated. The trials were conducted in autoclaves under temperatures and pressures indicated in Table B. The resultant products were fractionated and the fractions analyzed to determine their aromatic, saturate and olefin content. The fractions and their composition are shown in Table B below:

Table B
PROPYLENE CONVERSION

| Catalyst | 8.5 A. Alumino-Silicate | |
|---|---|---|
| | Unmodified | Modified with HCl |
| Temp. ° F. | 425 | 420 |
| Initial Pressure, p.s.i.g. | 2,200 | 2,100 |
| Final Pressure, p.s.i.g. | 1,600 | 1,100 |
| Feed, ml./100 g. of catalyst | 600 | 600 |
| Feed Composition: | | |
| Percent Aromatics | Nil | Nil |
| Percent Saturates | 1.5 | 1.5 |
| Percent Olefins | 98.5 | 98.5 |
| Product Composition: | | |
| $C_5$–300° F. Cut— | | |
| Vol. percent | 86 | 50 |
| Percent Aromatics | Nil | Nil |
| Percent Saturates | Nil | 35 |
| Percent Olefins | 100 | 65 |
| Bromine No. | 141 | 110 |
| 300–500° F. Cut— | | |
| Vol. percent | 12 | 40 |
| Percent Aromatics | Nil | 5 |
| Percent Saturates | Nil | 10 |
| Percent Olefins | 100 | 85 |
| Bromine No. | 95 | 75 |
| 500° F.+Cut— | | |
| Vol. percent | 2 | 10 |
| Percent Aromatics | Nil | 15 |
| Percent Saturates | Nil | 20 |
| Percent Olefins | 100 | 65 |
| Bromine No. | 71 | 40 |

Propylene conversion for the unmodified 8.5 A. alumino-silicate catalyst was only about 15.6 percent as compared to about 52.6 percent for the hydrogen chloride modified catalyst. Although Table B evidences that propylene is more difficult to polymerize than heptene, it is also apparent that the hydrogen chloride modified catalyst results in appreciable amounts of saturates and aromatics. The unmodified catalyst, on the other hand, produced no saturates or aromatics. An analysis of the individual distillation fractions from the modified catalyst run indicated that the lower boiling materials possessed considerable saturates while the higher boiling materials contained an appreciable quantity of aromatics as well as saturates.

EXAMPLE IV

In still another experiment U.O.P. $C_7$ streams, the characteristics of which are found in Table A above, were individually treated with three 8.5 A. crystalline metallic alumino-silicate catalysts. One catalyst was an unmodified 8.5 A. crystalline metallic alumino-silicate catalyst. Another catalyst was prepared in the manner described in Example I, except that the treatment was terminated when about 3 grams of anhydrous hydrogen chloride had been added to 100 grams of original 8.5 A. crystalline metallic alumino-silicate. This catalyst was therefore about 30% saturated with anhydrous hydrogen chloride. The last catalyst was prepared in the manner described in Example I and thus was 100% saturated with anhydrous hydrogen chloride. The runs were conducted in autoclaves under temperatures and pressures indicated in Table C. The total products were analyzed to determine their aromatic, saturate and olefin content. The results are in Table C below:

Table C
HEPTENE CONVERSION

| Catalyst | 8.5 A. Alumino-Silicate | | |
|---|---|---|---|
| g. HCl/100 g. 8.5 A. Alumino-Silicate | 0 | 3 | 10 |
| Feed, ml./120 g. catalyst | 800 | 800 | 800 |
| Temp., ° F. | 450 | 450 | 450 |
| Pressure, p.s.i.g. | 200 | 200 | 200 |
| Total Product Composition: | | | |
| Percent Aromatics | Nil | 5 | 21 |
| Percent Olefins | 100 | 71 | 5 |
| Percent Saturates | Nil | 24 | 74 |

This experiment demonstrates that the crystalline alumino-silicate need not be 100% saturated with anhydrous hydrogen chloride to be effective. Crystalline metallic alumino-silicates which are as low as 3% saturated with hydrogen chloride may convert $C_2$–$C_7$ olefins to aromatics and saturates, however it is preferred that the anhydrous hydrogen chloride content be maintained above about 25% saturation.

An additional important advantage of the hydrogen chloride modified catalyst of the present invention is its ease of regenerability. Any coke-like materials deposited on the catalyst may be readily removed and the catalyst restored to its initial activity by controlled combustion with a dilute oxygen stream, such as a mixture of 5% oxygen and 95% nitrogen, without removing the catalyst from the reactor. There will be little loss of hydrogen chloride in the regeneration step, particularly if the hydrogen chloride modified catalyst is prepared at 800 to 1000° F. and the regeneration temperatures are not above this range.

Although this invention has been described with relation to $C_3$ and $C_7$ olefins, $C_2$, $C_4$, $C_5$ and $C_6$ olefins may also be employed. Furthermore, the catalyst may be used to recover benzene from steam-cracked naphthas by converting the olefins to the higher boiling aromatics. Thus the process and catalyst of the present invention are useful in the preparation of saturated high octane blending stocks and aromatics. The aromatics are desired as solvents and chemical intermediates in addition to being components in high octane number motor gasolines.

What is claimed is:

1. A process for the conversion of $C_2$–$C_7$ olefinic hydrocarbons into saturates and aromatics which comprises contacting said olefinic hydrocarbons at temperatures of from about 300° F. to 1200° F. with a crystalline metallic alumino-silicate having uniform pore openings in the range of from about 6 to 15 Angstrom units and containing anhydrous hydrogen chloride.

2. The process of claim 1 wherein said olefinic hydrocarbons are contacted with said alumino-silicate at temperatures in the range of from 400° F. to 800° F.

3. The process of claim 1 wherein said alumino-silicate has uniform pore openings of about 8.5 Angstrom units.

4. The process of claim 1 wherein said alumino-silicate is more than about 25% saturated with anhydrous hydrogen chloride.

5. The process of claim 4 wherein said alumino-silicate is 100% saturated with anhydrous hydrogen chloride.

6. A process for the conversion of $C_2$–$C_7$ olefins into aromatics and saturated hydrocarbons boiling in the naphtha and motor fuel boiling ranges which comprises contacting said olefins at a temperature in the range of from 300° F. to 1200° F. with a crystalline metallic alumino-silicate containing anhydrous hydrogen chloride and having uniform pore openings of from 6 to 15 Angstrom units.

7. The process of claim 6 wherein said alumino-silicate is more than 25% saturated with anhydrous hydrogen chloride.

8. The process of claim 6 wherein said alumino-silicate has an empirical formula corresponding to $$\frac{Me_2O}{n}.Al_2O_3.2.7SiO_2$$

where Me is a metal and $n$ is its valence.

9. An improved catalyst for converting olefins into aromatics and saturates comprising a crystalline metallic alumino-silicate containing anhydrous hydrogen chloride and having uniform pore openings of from 6 to 15 Angstrom units, said alumino-silicate being more than about 3% saturated with anhydrous hydrogen chloride.

10. The catalyst of claim 9 wherein said alumino-silicate has an empirical formula corresponding to $$\frac{Me_2O}{n}.Al_2O_3.2.7SiO_2$$

where Me is a metal and $n$ is its valence.

11. The catalyst of claim 9 wherein said alumino-silicate is more than about 25% saturated with anhydrous hydrogen chloride.

12. The catalyst of claim 9 wherein said alumino-silicate is 100% saturated with anhydrous hydrogen chloride.

13. The catalyst of claim 12 wherein said alumino-silicate has uniform pore openings of about 8.5 Angstrom units.

References Cited in the file of this patent

UNITED STATES PATENTS

| | | |
|---|---|---|
| 2,709,151 | Nonnenmacher et al. | May 24, 1955 |
| 2,904,607 | Mattox et al. | Sept. 15, 1959 |
| 2,920,122 | Milton et al. | Jan. 5, 1960 |